(12) United States Patent
Phipps et al.

(10) Patent No.: US 7,347,661 B2
(45) Date of Patent: Mar. 25, 2008

(54) CASING ARRANGEMENT

(75) Inventors: Anthony B. Phipps, Uttoxeter (GB); Paul H. Edwards, Derby (GB); Adrian L. Harding, Derby (GB); Mark A. Halliwell, Derby (GB)

(73) Assignee: Rolls Royce, plc, London (GB)

( * ) Notice: Subject to any disclaimer, the term of this patent is extended or adjusted under 35 U.S.C. 154(b) by 389 days.

(21) Appl. No.: 11/041,451

(22) Filed: Jan. 25, 2005

(65) Prior Publication Data
US 2005/0238480 A1 Oct. 27, 2005

(30) Foreign Application Priority Data
Feb. 13, 2004 (GB) ................. 0403198.5

(51) Int. Cl.
 *F04D 29/38* (2006.01)
(52) U.S. Cl. ...................... 415/108; 415/116
(58) Field of Classification Search .............. 415/47, 415/108, 115, 116, 117, 134, 136, 137, 138, 415/178, 180
See application file for complete search history.

(56) References Cited

U.S. PATENT DOCUMENTS

| 4,023,919 | A | * | 5/1977 | Patterson ............... 415/134 |
| 4,643,638 | A | | 2/1987 | Laurello |
| 5,779,436 | A | | 7/1998 | Glezer et al. |

FOREIGN PATENT DOCUMENTS

| EP | 0 877 149 A2 | | 11/1998 |
| JP | A 58-57100 | | 4/1983 |
| JP | 06101418 A | * | 4/1994 |

* cited by examiner

*Primary Examiner*—Edward K. Look
*Assistant Examiner*—Dwayne J White
(74) *Attorney, Agent, or Firm*—Oliff & Berridge, PLC

(57) ABSTRACT

A casing arrangement of a gas turbine includes a casing member, which is formed to extend at least partially around the component. The casing member defines a fluid flow path for the flow of a cooling fluid therethrough.

14 Claims, 4 Drawing Sheets

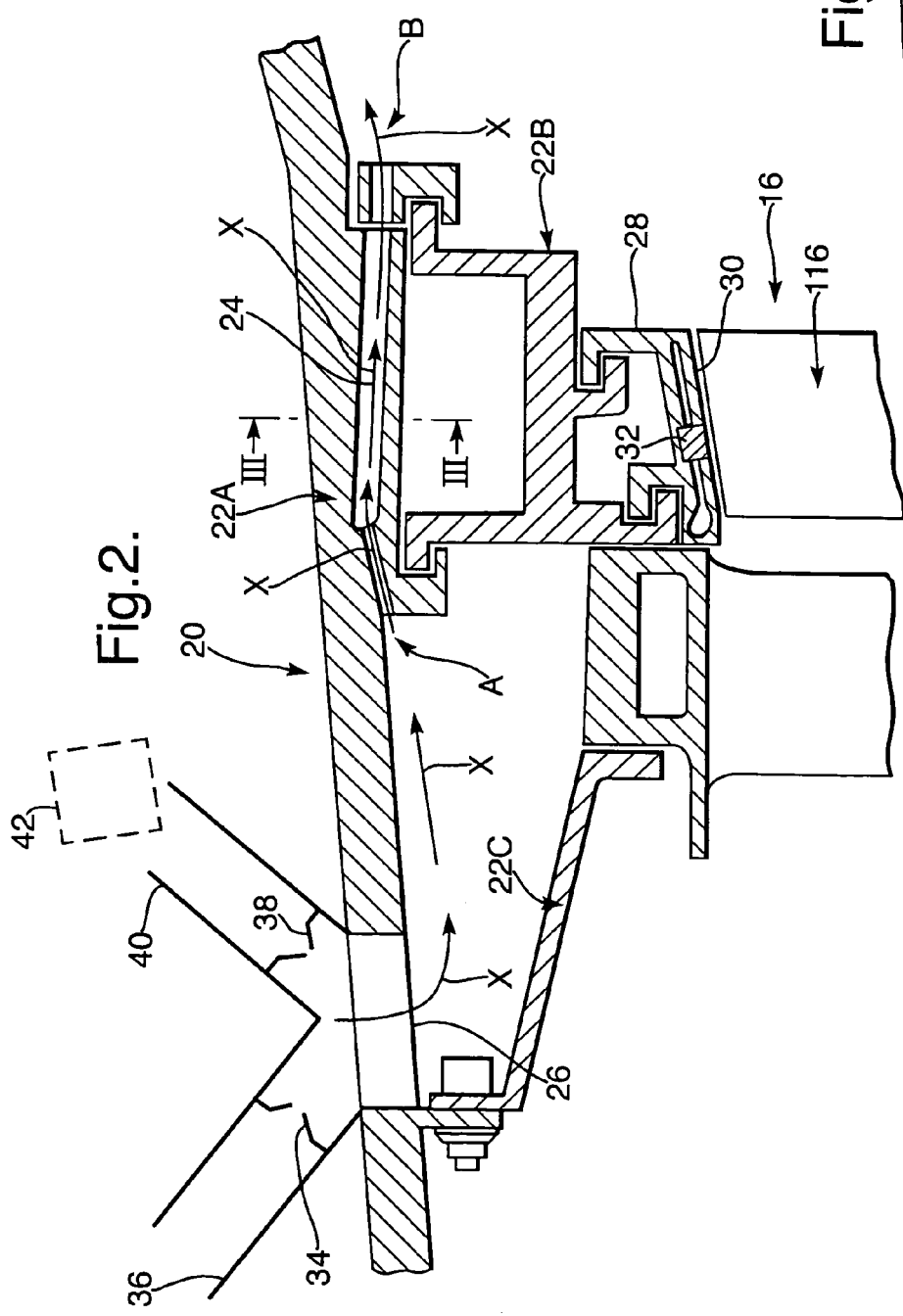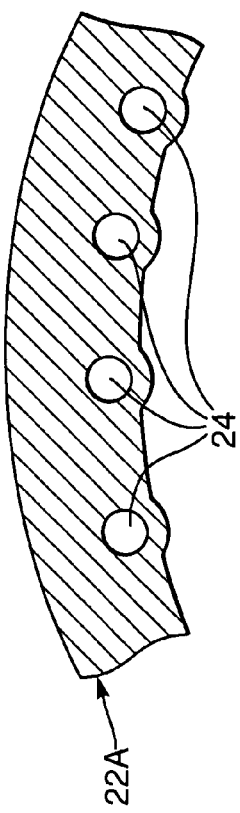

CASING ARRANGEMENT

This invention relates to casing arrangements. More particularly, but not exclusively, the invention relates to casing arrangements for surrounding rotary components of gas turbine engines, such as turbines.

In high-pressure turbines of gas turbine engines, it is necessary to ensure that there is a minimum clearance between the tip of the turbine blades and the casing surrounding the blades. However, during turbine operation, the temperature of the gases passing through the turbine causes the casing to expand thereby increasing the gap between the tip of the blades and the casing.

It is known, for instance from EP 0 877 149, to provide a gas turbine engine in which a casing that surrounds an array of turbine blades is itself surrounded by a manifold that directs cooling air on to the casing. The cooling air so directed causes the casing to thermally contract, so minimising the clearance between the casing and the tips of the blades that it surrounds. While such arrangements can be useful in ensuring that blade tip clearances are minimised, they do result in the provision of equipment on the external surface of the casing. Such equipment adds weight and can be undesirable if, for instance, the gas turbine engine in question is situated in a confined space or is of small size.

It is an object of the present invention to provide an improved cooled casing arrangement that is more compact than is the case with arrangements employing externally located cooling air manifold systems.

According to one aspect of this invention, there is provided a casing arrangement for surrounding a rotary component of a gas turbine engine, the casing arrangement comprising a casing member formed to extend at least partially around the component, wherein the casing member defines a fluid flow path for the flow of a heat transfer fluid therethrough, said arrangement additionally comprising a control device to control the rate of flow of heat transfer fluid through said defined fluid flow path and hence the extent of thermal expansion of said casing member.

The casing member may define a plurality of said paths, which extend generally parallel to one another. The, or each, path extend from an upstream region to a downstream region of the casing member.

Each fluid flow path may be extendible axially of the engine. The fluid flow paths may be arranged circumferentially adjacent each other around the engine.

The flow of said heat transfer fluid may be from the upstream region of the casing member to the downstream region thereof.

In one embodiment, a seal segment may be provided on the casing member. The casing member may include formations to mount the seal segment inwardly of the casing member. In this embodiment, the seal segment may be arranged between the casing member and the rotary component. The seal segment may define a fluid flow passage and the fluid flow path in the casing member may communicate with the fluid flow passage.

The casing arrangement may comprise a control device arranged to determine the distance between the rotary component and the casing arrangement. The control device may be disposed either on the casing member or on the seal segment between the casing arrangement and the rotary component.

The heat transfer fluid may be a cooling fluid and/or a heating fluid. In one embodiment, the control device may select a flow of heating fluid and/or a flow of cooling fluid, as circumstances dictate.

The control device may be connected, for example, electrically connected to a cooling fluid feed assembly to control the rate of flow of cooling fluid through the or each fluid flow path. The control device may be connected, for example, electrically connected to a heating feed assembly to control the rate of flow of heating fluid through the or each, flow path.

The passage may be communicatively connected to the heat transfer fluid flow path. Preferably, a chamber is arranged between the casing member and the seal segments whereby at least some of the heat transfer fluid exiting from the heat transfer fluid flow path enters the chamber. Heat transfer fluid from the chamber may enter the passage through the seal segment to provide cooling or heating to the seal segment.

Preferably, the control device controls the flow of the heat transfer fluid through the casing member such that the flow rate through the heat transfer fluid flow path is so arranged that the thermal response of the casing member matches the radial dimensional variation of the rotary component surrounded thereby.

In one embodiment, where the gas turbine engine includes a fan, the cooling fluid may be air provided from a cooler region of the engine, preferable from by-pass air driven by the fan. In another embodiment, the cooling air may be provided from air driven by the compressors of the engine. The heating fluid may be provided as gas taken from high temperature regions of the engine, e.g. the low pressure turbine. Alternatively, the heating fluid may be provided by a heating device e.g. an electrical heater.

Embodiments of the invention will now be described by way of example only, with reference to the accompanying drawings, in which:

FIG. 2 is a sectional side view of a first embodiment of a casing arrangement;

FIG. 3 is a view along the lines III-III of FIG. 2;

Figure 1:
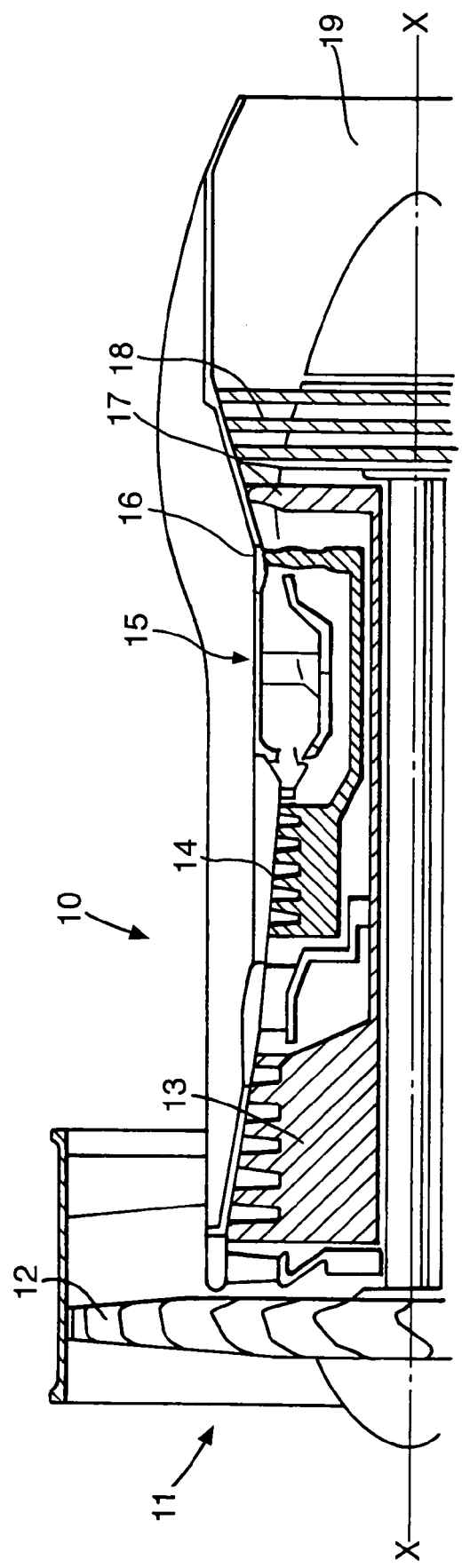
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the airflow directed into it before delivering that air to the high-pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive, the high, intermediate and low-pressure turbines 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

Referring to FIGS. 2 and 3 there is shown a circumferential sectional side view of a casing arrangement 20 encasing the high-pressure turbine 16. The high-pressure turbine 16 has a plurality of radially outwardly extending turbine blades 116 mounted on a disc (not shown). The casing arrangement 20 comprises a plurality of interconnected casing members, only some of which, namely casing members 22A, 22B, 22C are shown. Other casing members may be provided, as will be appreciated by a person skilled in the art, but these are not shown in FIG. 2.

The main casing member 22A in FIG. 2 defines a plurality of fluid flow paths 24 for the flow of a heat transfer fluid therethrough. As can be seen from FIG. 3, the heat transfer fluid flow paths 24 are arranged adjacent one another circumferentially around the high-pressure turbine blades 116.

The fluid flow paths 24 extend in an axial direction from an upstream region A of the turbine 16 to a downstream region B.

The heat transfer fluid flowing along the fluid flow paths 24 can be a cooling fluid or a heating fluid, or both, to control the gap or tip clearance 30 between the radially outer edges of the turbine blades 116 and seal segments 28 surrounding the turbine blades 116, as explained below.

In order to supply a cooling fluid to the fluid flow paths 24, at least some of the air from the fan 12, which bypasses the compressors 13, 14 and the turbines 16, 17, 18 passes through the casing member 22A via an aperture 26, and thereafter passes into the fluid flow paths 24 at the upstream region A to exit therefrom at the downstream region B, as shown by the arrows X.

A plurality of circumferentially extending seal segments 28 are arranged radially inwardly of the casing member 22B to provide a seal with the turbine blades 116. A gap or tip clearance 30 is defined between the radially outer edges of the turbine blades 116 and the radially inner surface of the seal segments. It is desirable to maintain the tip clearance 30 at the required distance to minimise leakage of air across the tips of the turbine blades 116.

During operation of the turbine 16, the hot gases can cause the casing arrangement 20 to expand, thereby increasing the size of the tip clearance 30. The flow of cooling air through the fluid flow path 24 minimises the extent of this expansion.

In order to control the level of expansion of the casing 20, a measuring device or probe 32 is provided on the seal segments 28. The probe 32 measures the tip clearance 30 between the tips of the blades 116 and the radially inner surface of the seal 28. The probe 32 is electrically connected to a valve shown schematically at 34 in a conduit 36 (also shown schematically) that directs the cooling fluid through the aperture 26 to the fluid flow paths 24. As the tip clearance 30 increases, the probe 32 directs the valve 34 to open further thereby allowing more and more cooling air to flow through the fluid flow paths 24 to limit or reduce the expansion of the casing 20, thereby reducing the tip clearance 30, or decreasing the rate of increase of the tip clearance 30.

In certain circumstances, it may be necessary to supply heating air through the fluid flow paths 24 to control the tip clearance. In such circumstances, the probe 32, which is also electrically connected to a valve, shown schematically at 38 in a conduit 40 (also shown schematically). The conduit 36 directs the heating fluid through the aperture 26 to the fluid flow paths 24, to increase the, tip clearance 30. Thus, by the use of the cooling and heating fluids as described above the tip clearance 30 can be precisely controlled.

The heating fluid can be provided from a turbine e.g. the low pressure turbine 18 and/or from an electrical heating device 42 shown schematically in FIG. 2 in broken lines.

Figure 4:
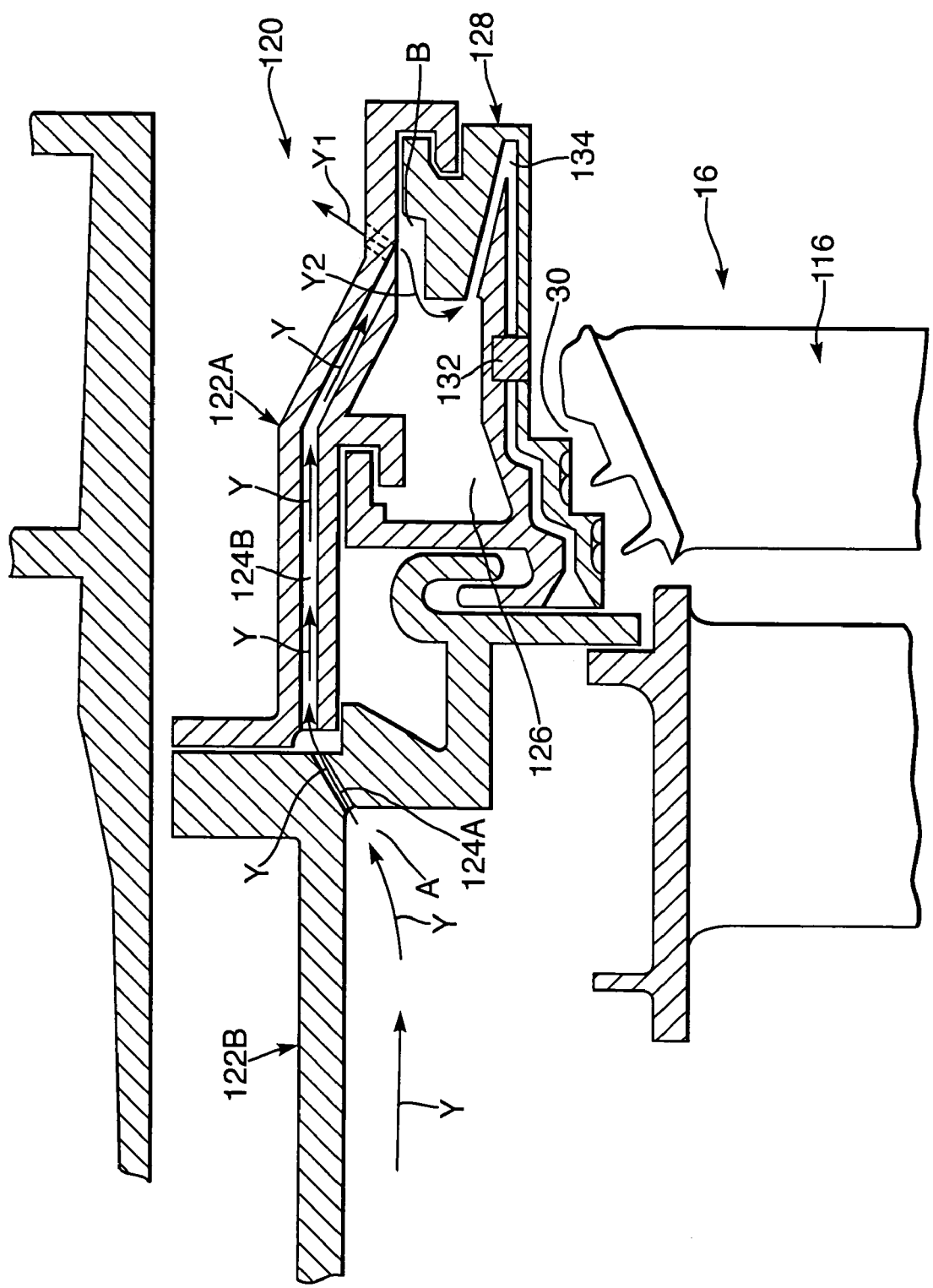
FIG. 4 is a sectional side view of a second embodiment of a casing arrangement.

Referring to FIG. 4, there is shown a further embodiment, which comprises many of the same features as shown in FIG. 2, i.e. a casing 120 which extends circumferentially around the turbine blades 116. The casing 120 comprises a plurality of casing members 122A, 122B, 122C. A seal segment 128 is mounted on the casing members 122A, 122B and provides a seal against the radially outer tip of the turbine blade 116, in the same way as for the embodiment shown in FIG. 2.

The casing members 122A, 122B define a fluid flow path 124A, 124B. The fluid flow path 124A, 124B receives heat transfer fluid from the compressors 13, 14, as shown by the arrows Y, or from the turbines or other suitable heating device 42 (see FIG. 2). The heating fluid enters at an upstream region A and travels to a downstream region B of the fluid flow path 124A, 124B. At the downstream region B, the heat transfer splits into two streams. The first stream, designated Y1, passes out of the casing arrangement 20 and can then be passed to exhaust. The second stream, labelled Y2, passes into a main circumferential chamber 126 provided between the casing member 122A and the seal segment 128. The second stream Y2 of the heat transfer fluid then passes from the main circumferential chamber 126 into a heat transfer path 134 in the seal segment 128, thereby providing heat transfer for the seal segment 128.

As shown in FIG. 4, the seal segment 28 is provided with a probe 132, similar to the probe 32 shown in FIG. 2 and this is electrically connected to valves (not shown in FIG. 4) for controlling the rate of flow of heat transfer fluid from the compressor, turbine or heating device to the fluid flow path 124A, 124B.

Figure 5:
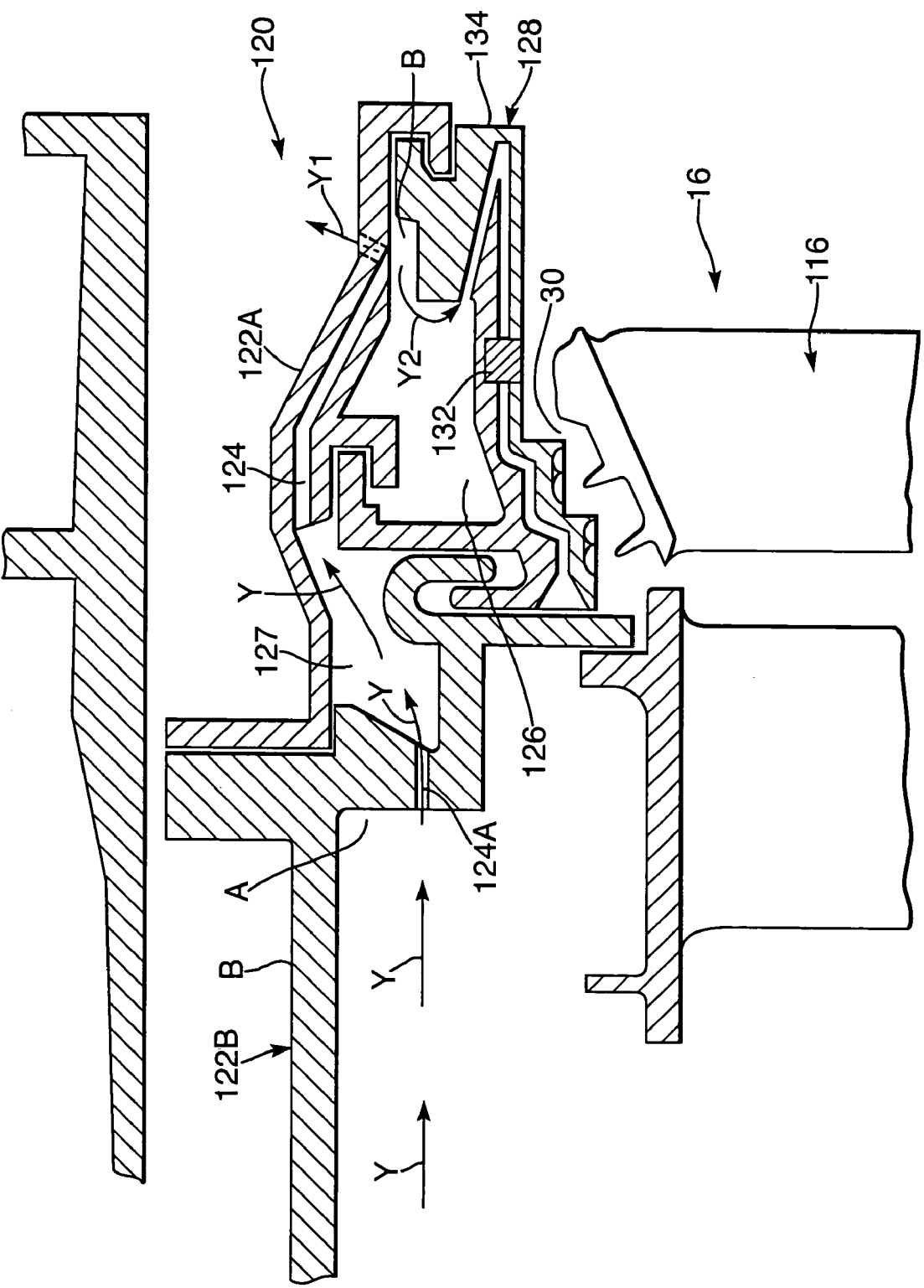
FIG. 5 is a sectional side view of a third embodiment of a casing arrangement.

In operation, the embodiment shown in FIG. 4 operates in a similar way to that shown in FIG. 2, in that heat transfer fluid in the form of gas flows through the fluid flow path 124A, 124B to the extent of expansion of the casing 120, thereby controlling the tip clearance 30. A further modification is shown in FIG. 5, which is almost the same as the embodiment shown in FIG. 4 and the same features have been designated with the same reference numerals. The embodiment shown in FIG. 4 differs from the embodiment shown in FIG. 4 in that the first part 124A of the fluid flow path directs the heat transfer fluid into a preliminary circumferentially extending chamber 127, and thereafter, the heat transfer fluid passes into the second part 124B of the fluid flow path to the downstream region B where it separates into two streams Y1, Y2. The stream designated Y2 passes into the main circumferential chamber 126 and thereafter into the fluid flow path 134 of the seal segment 128.

There is thus described a casing arrangement 20 for a gas turbine engine 10 which allows heat transfer fluid to be passed therethrough to enable the expansion of the casing arrangement 20 to be controlled, and restricted thereby controlling the gap between the tips of the turbine blades 115 and the seal segments 28.

Various modifications can be made without departing from the scope of the invention. For example, the arrangement of casing members can be varied.

A further notification is that the arrangement described above can be operated passively without the active control of the flow of the heat transfer fluid. In this embodiment, the arrangement does not have the probe 32, and there is no direct measurement of the tip clearance 30.

We claim:

1. A casing arrangement for surrounding a rotary component of a gas turbine engine, the casing arrangement comprising:
   a casing member formed to extend at least partially around the component, wherein at least one fluid flow path for the flow of a heat transfer fluid is formed within the casing member; and
   a control device to control the rate of flow of heat transfer fluid through said defined at least one fluid flow path and hence the extent of thermal expansion of said casing member, wherein
   the casing member includes formations to mount a seal segment inwardly of the casing member, whereby the seal segment is positioned between the casing member and the rotary component,
   the casing member defines a plurality of said paths which extend generally parallel to one another, said paths extending from an upstream region to a downstream region of the casing member, and
   the seal segment defines at least one fluid flow passage which is in communication with said at least one fluid flow path within the casing member.

2. A casing arrangement according to claim 1 wherein the fluid flow paths are arranged to extend axially of the engine and are positioned circumferentially adjacent one another around the engine.

3. A casing arrangement according to claim 1, wherein a chamber is arranged between the casing member and the seal segment such that at least some of the heat transfer fluid exiting from the fluid flow path enters the chamber, and fluid from the chamber enters the fluid flow passage in the seal segment to provide heat transfer at the seal segment.

4. A casing arrangement according to claim 1 and comprising a control device arranged to determine the distance between the rotary component and the seal segment.

5. A casing arrangement according to claim 4, wherein the control device is disposed on one of the casing member and the seal segment between the casing arrangement and the rotary component.

6. A casing arrangement according to claim 4, wherein the control device controls the flow of fluid through the casing member such that the thermal response of the casing member matches the radial dimensional variation of the rotary component encased thereby.

7. A casing arrangement according to claim 1, wherein the heat transfer fluid comprises cooling fluid.

8. A casing arrangement as claimed in claim 7, wherein the gas turbine engine includes a fan and the cooling fluid comprises air provided from by-pass air driven by the fan.

9. A casing arrangement according to claim 7, wherein the cooling fluid is air provided from air driven by the compressors of the engine.

10. A casing arrangement according to claim 1 wherein the heat transfer fluid comprises heating fluid.

11. A casing arrangement according to claim 10 wherein the heating fluid is provided from a turbine of the gas turbine engine.

12. A casing arrangement according to claim 10 comprising a heating device for heating the heat transfer fluid to provide the heating fluid.

13. A turbine arrangement incorporating a casing arrangement as claimed in claim 1.

14. A gas turbine engine incorporating a turbine arrangement as claimed in claim 9.

* * * * *